(12) United States Patent (10) Patent No.: US 8,199,686 B1
Donovan (45) Date of Patent: Jun. 12, 2012

(54) WIRELESS LOCAL AREA NETWORK INFRASTRUCTURE MODE FOR REDUCING POWER CONSUMPTION

(75) Inventor: Timothy J. Donovan, Livermore, CA (US)

(73) Assignee: Marvell International Ltd., Hamilton (BM)

( * ) Notice: Subject to any disclaimer, the term of this patent is extended or adjusted under 35 U.S.C. 154(b) by 2545 days.

(21) Appl. No.: 10/818,395

(22) Filed: Apr. 2, 2004

Related U.S. Application Data

(60) Provisional application No. 60/550,139, filed on Mar. 4, 2004.

(51) Int. Cl.
*G08C 17/00* (2006.01)
(52) U.S. Cl. ............... 370/311; 370/318; 455/343.2; 455/343.4
(58) Field of Classification Search .......... 370/331, 370/338, 389; 455/574
See application file for complete search history.

(56) References Cited

U.S. PATENT DOCUMENTS

| | | | | |
|---|---|---|---|---|
| 6,067,297 | A * | 5/2000 | Beach | 370/389 |
| 7,756,082 | B1 * | 7/2010 | Dhamdhere | 370/331 |
| 2003/0012163 | A1 * | 1/2003 | Cafarelli et al. | 370/338 |
| 2004/0253996 | A1 * | 12/2004 | Chen et al. | 455/574 |
| 2005/0136913 | A1 * | 6/2005 | Kampen et al. | 455/426.2 |

OTHER PUBLICATIONS

IEEE Standard 802.11, 1999 Edition, Information Technology—Telecommunications and information exchange between systems—Local and metropolitan area networks—Specific requirements, Part 11: Wireless LAN Medium Access Control (MAC) and Physical Layer (PHY) Specifications, pp. 1-512.
IEEE Standard 802.11a-1999, Supplemental to IEEE Standard for Information Technology—Telecommunications and information exchange between systems—Local and metropolitan area networks—Specific requirements, Part 11: Wireless LAN Medium Access Control (MAC) and Physical Layer (PHY) specifications: High-Speed Physical Layer in the 5 GHz band, Adopted by the ISO/IEC and redesignated as ISO/IEC 8802-11:1999 Amd 1:2000(E), pp. 1-83.

(Continued)

*Primary Examiner* — Lester Kincaid
*Assistant Examiner* — Isaak R Jama

(57) ABSTRACT

A client station that communicates with an access point (AP) in a wireless local area network (LAN) includes a media access control (MAC) device that controls transitions between an active mode and a low power mode. A radio frequency (RF) transceiver communicates with the MAC device. After the MAC device transitions the client station to the active mode, the RF transceiver transmits data to the AP when at least one of the AP finishes transmitting directed data to the RF transceiver and the AP transmits a null data frame to the RF transceiver. The MAC device transitions the client station to the low power mode when the RF transceiver finishes transmitting data to the AP. The AP uses at least one of a random order and a rotating order to access the client station. The client station and the AP are implemented in a console gaming system.

98 Claims, 11 Drawing Sheets

OTHER PUBLICATIONS

IEEE Standard 802.11b-1999, Supplemental to IEEE Standard for Information Technology—Telecommunications and information exchange between systems—Local and metropolitan area networks—Specific requirements, Part 11: Wireless LAN Medium Access Control (MAC) and Physical Layer (PHY) specifications: Higher-Speed Layer Extension in the 2.4 GHz band, Sep. 16, 1999, pp. 1-89.

IEEE Standard 802.11b-1999/Cor 1-2001, IEEE Standard for Information technology—Telecommunications and information exchange between systems—Local and metropolitan area networks—Specific requirements, Part 11: Wireless LAN Medium Access Control (MAC) and Physical Layer (PHY) specifications; Amendment 2: Higher-speed Physical Layer (PHY) extenstion in the 2.4 GHz band—Corrigendum 1, IEEE Computer Society, Nov. 7, 2001, pp. 1-15.

IEEE Standard P802.11g/D8.2, Draft Supplemental to Standard [for] Information Technology, Telecommunications and information exchange between system—Local and metropolitan area networks—Specific requirements, Part 11: Wireless LAN Medium Access Control (MAC) and Physical Layer (PHY) specifications; Further Higher Data Rate Extension in the 2.4 GHz band, Apr. 2003, pp. 1-69.

U.S. Appl. No. 10/650,887, filed Aug. 28, 2003.

* cited by examiner

WIRELESS LOCAL AREA NETWORK INFRASTRUCTURE MODE FOR REDUCING POWER CONSUMPTION

CROSS-REFERENCE TO RELATED APPLICATIONS

This application claims the benefit of U.S. Provisional Application No. 60/550,139, filed on Mar. 4, 2004. The disclosure of the above application is incorporated herein by reference.

FIELD OF THE INVENTION

The present invention relates to wireless networks, and more particularly to wireless networks operating in an infrastructure mode.

BACKGROUND OF THE INVENTION

IEEE section 802.11 defines several different standards for configuring wireless Ethernet networks and devices. For example, 802.11 standards include 802.11, 802.11(a), 802.11(b) and 802.11(g), which are hereby incorporated by reference. According to these standards, wireless Ethernet network devices may be operated in either an infrastructure mode or an ad-hoc mode.

In the infrastructure mode, the wireless network devices or client stations communicate with each other through an access point. In the ad-hoc mode, the wireless network devices (which are typically called mobile stations) communicate directly with each other and do not employ an access point. The term mobile station or client station may not necessarily mean that a wireless network device is actually mobile. For example, a desktop computer that is not mobile may incorporate a wireless network device and operate as a mobile station or client station.

A wireless network that operates in an infrastructure mode includes an access point (AP) and at least one client station that communicates with the AP. For example, the wireless network may operate in an infrastructure mode as defined by IEEE 802.11 and other future standards. Since the client stations are often battery powered, it is important to minimize power consumption to preserve battery life. Therefore, some client stations implement a low power mode and an active mode. During the active mode, the client station transmits and/or receives data. During the low power mode, the client station shuts down components and/or alters operation to conserve power. Usually, the client station is not able to transmit or receive data during the lower power mode.

Wireless network devices may be implemented by a system on chip (SOC) circuit that includes a baseband processor (BBP), a media access control (MAC) device, a host interface, and optionally one or more processors. A host communicates with the wireless network device via the host interface. The SOC circuit may include a radio frequency (RF) transceiver or the RF transceiver may be located externally. The host interface may include a peripheral component interface (PCI), although other types of interfaces may be used. The processor(s) may be Advanced RISC Machine (ARM) processor(s), although other types of processors may be used.

The MAC device controls and selects different operating modes of the BBP and the RF transceiver. During operation, the MAC device instructs the BBP and the RF transceiver to transition to a low power mode to conserve power. The BBP and RF transceivers may include phase-locked loops (PLL), which are calibrated using a reference signal that is supplied by a crystal oscillator (XOSC). The SOC may also include voltage regulators that provide regulated supply voltages to the system.

In an infrastructure mode, the MAC device may instruct the BBP and the RF transceiver to transition to a low power mode when all of the client stations are finished communicating with the AP. Usually, the voltage regulator in the BBP, the XOSC, and PLL devices remain active and consume power during the low power mode.

In some conventional approaches, the operating voltage and/or the clock frequency are reduced during the low power mode while still allowing the system to operate at full capacity. In other conventional approaches, the way that functions are implemented is modified to reduce power consumption. For example, the device may lower a frequency of operation so that calculations take longer to complete.

In another approach, a wireless network device has active and low power modes. A first voltage regulator regulates supply voltage during the active mode. A second voltage regulator dissipates less power than the first voltage regulator and regulates supply voltage during the low power mode. The MAC device selects the first voltage regulator during the active mode and the second voltage regulator during the low power mode. A crystal oscillator outputs a timing signal to the first PLL during the active mode. A first oscillator selectively generates a first clock signal during the low power mode. The first oscillator dissipates less power than the crystal oscillator.

In wireless networks, there are many reasons that make it difficult to stay in the low power mode for a period of time that is sufficient to significantly reduce average power consumption. For example, a client station in an infrastructure network typically waits for an acknowledgement frame from the access point every time the client station transmits a frame to the access point. This increases the required duration of the active mode for all client stations and also consumes unnecessary power.

In some approaches, before the client station can enter the low power mode, the client station must exchange messages or frames with the access point (hereinafter "a power savings frame exchange"). The power savings frame exchange involves data transmission, which is the activity that consumes the most power. Therefore, the power savings frame exchange, which is used each time that the client stations enter the low power mode, further increases power consumption of the client stations.

Referring to FIG. 1, a console gaming system 10 according to the prior art includes a console 12 and input devices 14. The input devices 14 may comprise any conventional input devices for a console gaming system including handheld controllers, mice, and keyboards. The input devices 14 allow a user to interact with a gaming or video entertainment program that is processed by the console 12. Conventional input devices for console gaming systems include wired interfaces such as universal serial bus (USB) interfaces, universal asynchronous receiver-transmitter (UART) interfaces, or other wired interfaces. The wired interfaces limit the mobility of the input devices 14.

Referring now to FIG. 2, a system-on-chip (SOC) 22 in a conventional input device 14 for a console gaming system includes user interfaces 24 and a console interface 26. The user interfaces 24 include a key scan interface 28, a joystick detect interface 30, and a motor control interface 32. The key scan interface 28 detects when a user presses a button on the input device 14 and transmits button information to the console interface 26. The joystick detect interface 30 detects the position of a joystick on the input device 14 and transmits joystick information to the console interface 26. For example, conventional input devices for console gaming systems include both buttons and analog joysticks.

The motor control interface 32 controls a speed of a motor in the input device 14 and enables and disables the motor. The console interface 26 transmits motor control information from the console 12 to the motor control interface 32. Conventional input devices for console gaming systems include motors that produce vibration effects, which enhances a user's interactive experience. The console interface 26 transmits/receives information to/from the user interfaces 24 and the console 12. As illustrated in FIG. 2, the console interface 26 is typically a wired interface such as a USB or UART interface.

In one configuration, the console interface 26 includes an RF transceiver that provides wireless functionality. In this case, the input devices 14 have dedicated RF transceivers that are connected to typical wired interfaces at the console 12. However, the wireless input devices are battery powered. Input devices with wireless functionality may not include motor control interfaces 32 because motors consume high power, which drains batteries very quickly.

SUMMARY OF THE INVENTION

A client station that communicates with an access point (AP) in a wireless local area network (LAN) according to the present invention includes a media access control (MAC) device that controls transitions between an active mode and a low power mode. A radio frequency (RF) transceiver communicates with the MAC device. After the MAC device transitions the client station to the active mode, the RF transceiver transmits data to the AP when at least one of the AP finishes transmitting directed data to the RF transceiver and the AP transmits a null data frame to the RF transceiver. The MAC device transitions the client station to the low power mode when the RF transceiver finishes transmitting data to the AP.

In other features, the AP uses at least one of a random order and a rotating order to access the client station. After the MAC device transitions the client station to the active mode and before the RF transceiver receives a timing beacon from the AP, the MAC device queries a host for frames to transmit to the AP and stores the frames in a buffer. An internal processor functions as the host and generates the frames.

In still other features of the invention, the MAC device transitions the client station to the active mode prior to a first timing beacon from the AP and transitions the client station to the low power mode prior to a subsequent timing beacon from the AP. The MAC device updates a network time based on the first timing beacon. The network time is set equal to a prior beacon time plus a beacon interval minus a fixed delay. The AP transmits one of multicast frames and broadcast frames to the RF transceiver immediately after transmitting the first timing beacon.

In yet other features, the RF transceiver transmits at least one frame to the AP following a short interframe space (SIFS). The AP establishes a basic service set (BSS) that includes a contention free period (CFP) that follows a timing beacon and a contention base period (CBP) that follows the CFP. Only client stations in a restricted network communicate with the AP during the CFP. The AP communicates with at least one wireless device that is external to the restricted network during the CBP.

In still other features of the invention, the AP transmits a null data frame to the RF transceiver when the AP has zero directed frames to transmit to the RF transceiver. A first voltage regulator regulates supply voltage during the active mode and is powered down during the low power mode. A second voltage regulator dissipates less power than the first voltage regulator and regulates supply voltage during the low power mode. The MAC device selects the first voltage regulator during the active mode and the second voltage regulator during the low power mode. A baseband processor (BBP) performs radio frequency mixing and communicates with the MAC device and the RF transceiver. A first phase locked loop (PLL) generates a first clock signal for the BBP during the active mode. A crystal oscillator outputs a timing signal to the first PLL during the active mode. The RF transceiver communicates with the BBP and includes a second PLL that receives the timing signal from the crystal oscillator during the active mode and generates a second clock signal for the RF transceiver.

In yet other features, a first oscillator generates a third clock signal during the low power mode. The first oscillator dissipates less power than the crystal oscillator. When the MAC device initiates the low power mode, at least one of the first voltage regulator, the RF transceiver, the first PLL, the second PLL and the crystal oscillator is shut down. The MAC device includes a counter. When the MAC device initiates the low power mode, the second voltage regulator powers the first oscillator and the counter. When the counter reaches a predetermined count, the MAC device powers up at least two of the crystal oscillator, the first voltage regulator, the RF transceiver, the first PLL and the second PLL. The client station and the AP are implemented in a console gaming system. The client station is implemented in an input device and the AP is implemented in a console of the console gaming system.

In still other features of the invention, a processor communicates with the crystal oscillator and calibrates the first oscillator using the timing signal from the crystal oscillator. At least two of the BBP, the first voltage regulator, the second voltage regulator, the RF transceiver, the MAC device, and the first PLL are implemented by a system on chip (SOC). The client station is otherwise compliant with at least one of IEEE section 802.11, 802.11(a), 802.11(b), and 802.11(g). The wireless LAN is an infrastructure network. The client station is a client station in an infrastructure network.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
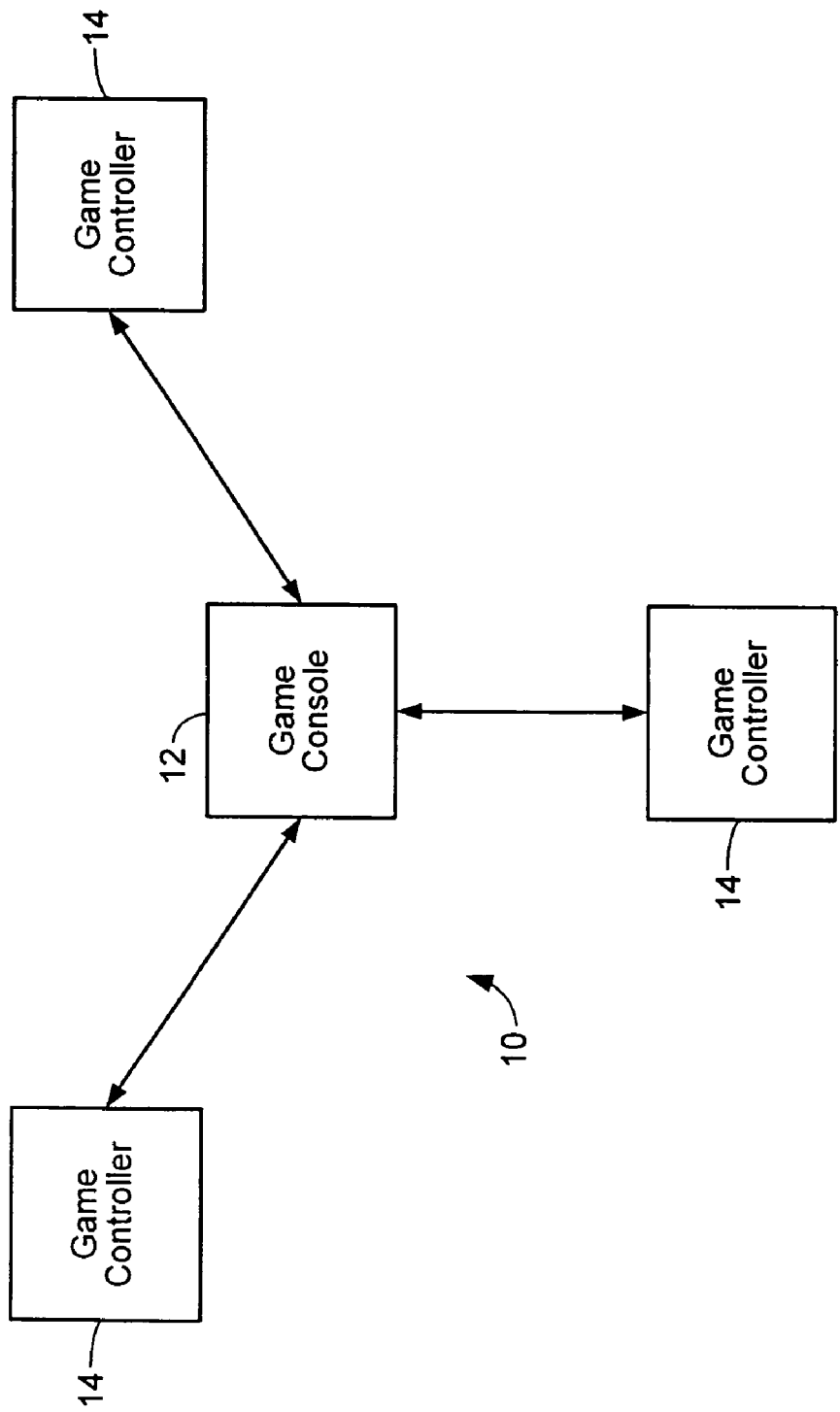
FIG. 1 illustrates a console gaming system that includes input devices with wired interfaces to a console according to the prior art.
Figure 2:
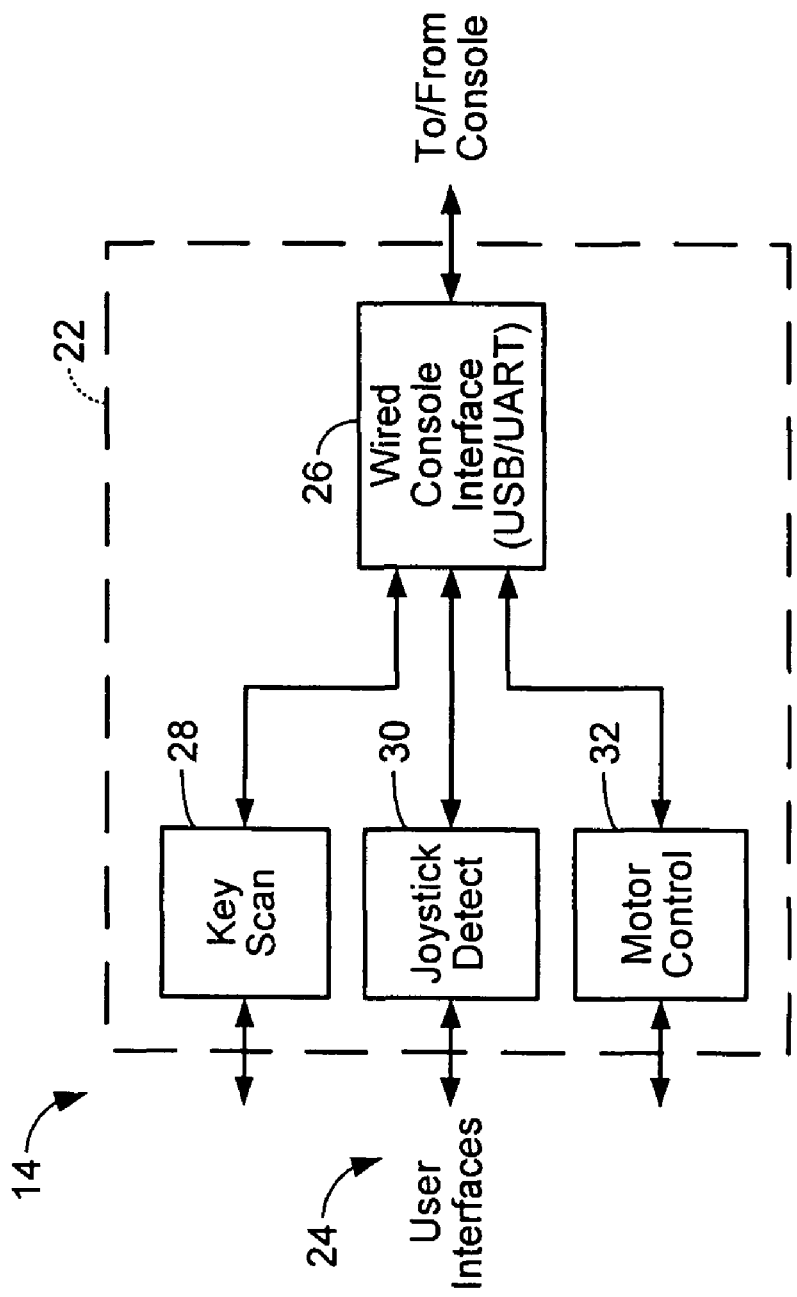
FIG. 2 is a functional block diagram of a system-on-chip (SOC) for an input device in a console gaming system according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

To minimize power consumption, the wireless infrastructure power savings mode according to the present invention allows a client station to transition to a low power mode after the client station finishes transmitting frames to the access point (AP). This eliminates the need for a power savings frame exchange, which reduces the average power consumption of the client stations.

In some types of infrastructure networks, all of the client stations need to transmit data regularly, for example, at each beacon interval. One example of this type of infrastructure network is a wireless console gaming application. Since all client stations transmit frames to the AP after each beacon interval, the AP determines a client station access sequence after each beacon transmission. The AP varies the client station access sequence by randomizing or rotating the order following each beacon transmission. This equalizes power consumption between the client stations.

The AP establishes a basic service set (BSS) that includes a contention free period (CFP) following each beacon transmission and a contention base period (CBP) following the CFP. Conventional APs may or may not include a CFP after every beacon transmission. However, for the power savings mode of the present invention, it is desirable to include a CFP after every beacon transmission. Only client stations that are part of an infrastructure mode power savings network communicate with the AP during the CFP. The AP sets the duration of the CFP to be long enough for all of the client stations to transmit frames to the AP. The AP may communicate with wireless devices that are external to the power savings network when all of the power savings network client stations have entered the power savings mode. This can be at the end of the CFP or during the CBP.

The client stations exit the power savings mode prior to the arrival of a beacon transmission. This allows the client stations to queue any data intended for the AP in a buffer. Immediately following a beacon transmission, the AP transmits any multicast or broadcast frames to the client stations, when all of the client stations are in the active mode. The AP may or may not have directed frames to transmit to a client station. If the AP has directed frames for the client station, the AP utilizes a "more data" field that is included in conventional IEEE 802.11 frame headers to indicate the last frame in a transmission. For example, when the "more data" field of a frame has a value that is equal to 1, the AP has more frames to transmit to the client station. When the "more data" field of a frame is equal to 0, the AP has no more directed frames for the client station.

When the client station detects a frame with a "more data" field that is equal to 0, the client station begins transmitting frames to the AP. This eliminates the need for a power save poll frame from the client station, and the client station executes a short interframe space (SIFS) prior to each frame that is transmitted to the AP. If the AP has no directed frames for the client station, the AP may transmit a null data frame to the client station to indicate that the client station may transmit frames to the AP.

A client station immediately begins transmitting frames to the AP after receiving one of a PS poll frame, a null data frame, and a directed frame with a "more data" field that is equal to 0. The client station executes a SIFS interval before transmitting each frame. Therefore, the client station does not wait for an acknowledgement from the AP before transmitting another frame. The client station may also take advantage of the "more data" field to inform the AP when it has no more frames to transmit. The client station transmits a final frame to the AP by setting the "more data" field equal to 0. At this point, the AP can send a directed frame to the client.

The AP can then access the next client station in a sequence. After the last client station in the sequence transmits frames to the AP, the AP can communicate with wireless devices that are external to the power savings network until the next beacon transmission. The AP may also transmit a Contention Free End (CF-End) frame to wireless devices that are external to the power savings network prior to the end of the CFP to inform the external wireless devices that the AP is available.

Figure 3:
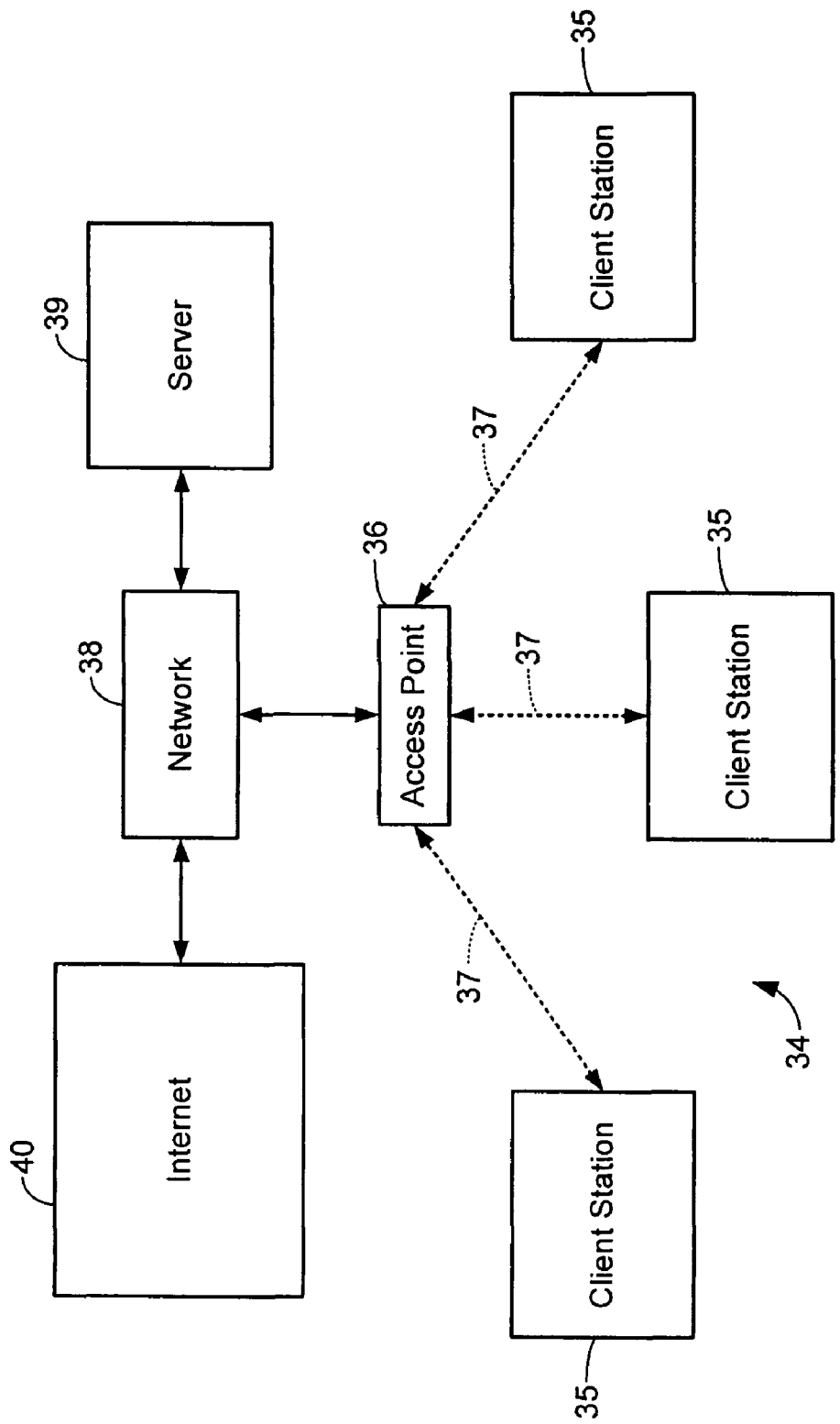
FIG. 3 illustrates a wireless network that is configured in an infrastructure mode and that includes client stations and an access point (AP) according to the present invention.

Referring to FIG. 3, an exemplary wireless network 34 is illustrated in an infrastructure mode. The wireless network 34 includes client stations 35 and an access point (AP) 36. The client stations 35 and the AP 36 transmit and receive wireless signals 37. The AP 36 in FIG. 3 is a node in a network 38. The network 38 may be a local area network (LAN), a wide area network (WAN), or another network configuration. The network 38 may include other nodes such as a server 39 and may be connected to a distributed communications system 40 such as the Internet.

Figure 4:
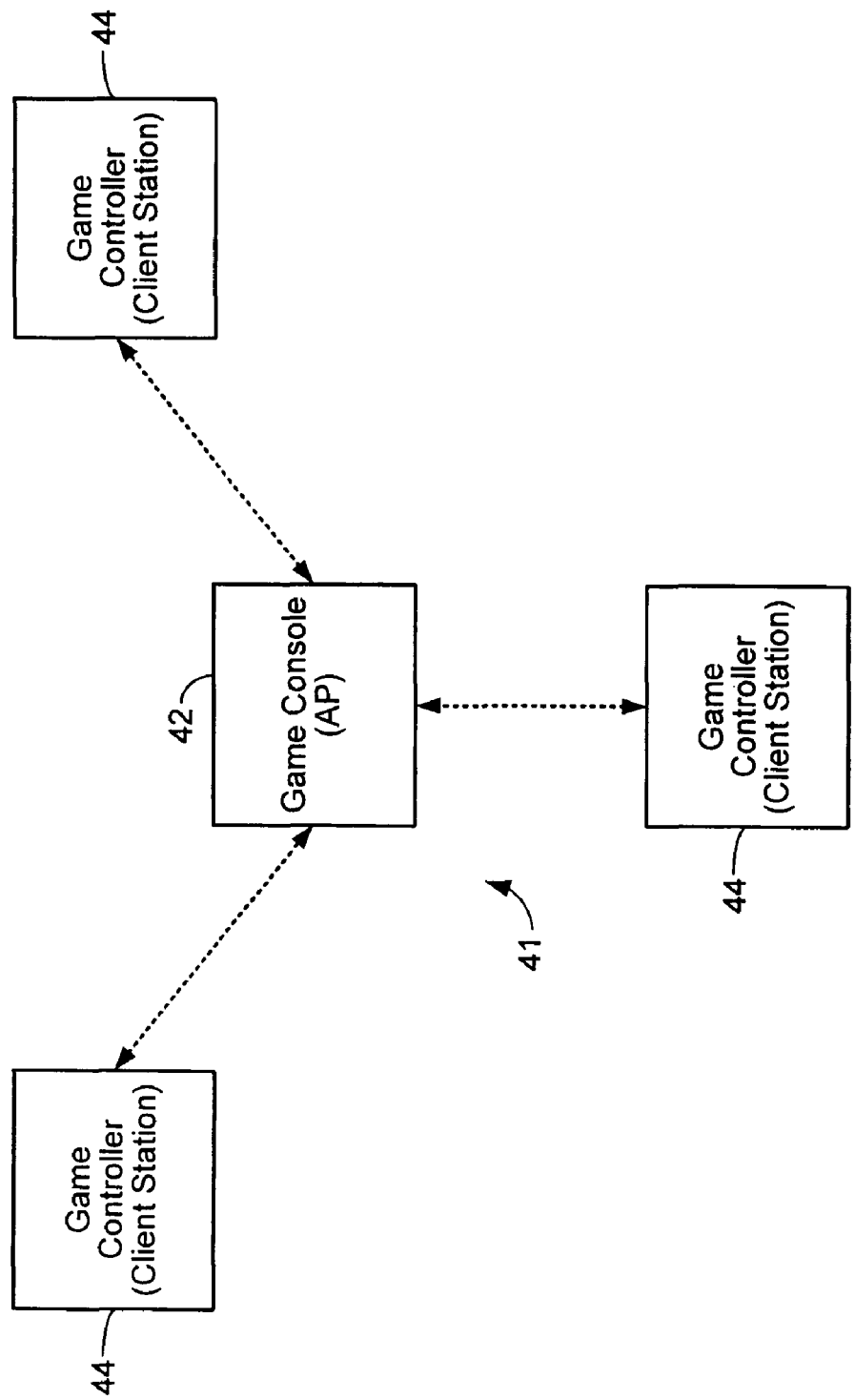
FIG. 4 illustrates a console gaming system that is configured in an infrastructure mode wireless local area network (LAN) according to the present invention.

Referring now to FIG. 4, a wireless console gaming system 41 according to the present invention includes a console 42 and wireless input devices 44. The wireless input devices 44 include wireless local area network (LAN) hardware and operate as client stations in an infrastructure mode power savings network. The console 42 also includes wireless LAN hardware and operates as an access point (AP) in the power savings network. The wireless console gaming system 41 allows for greater mobility for the wireless input devices 44 and conserves power during the low power mode. Those skilled in the art can appreciate that the console 42 may still interface with wired input devices.

Figure 5:
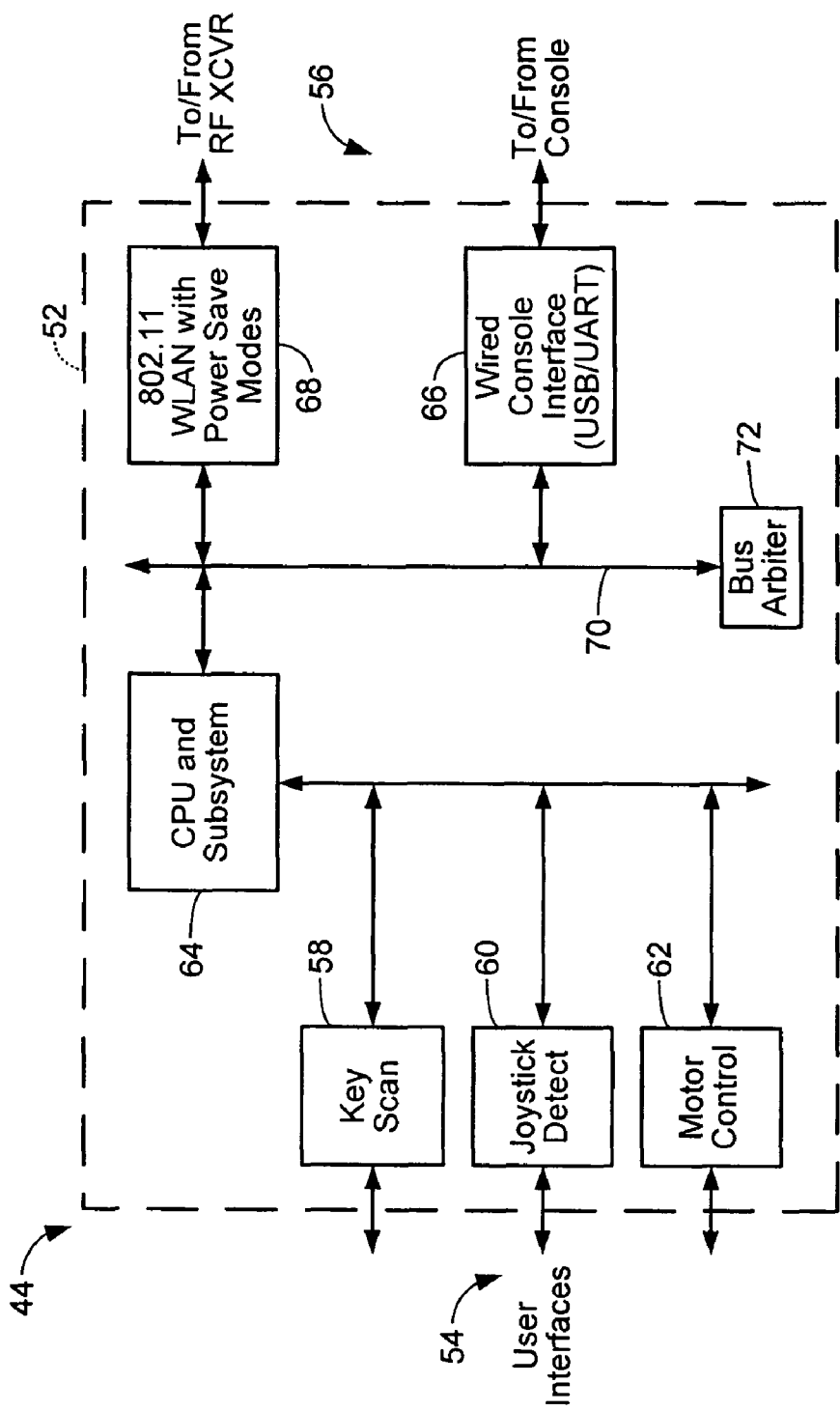
FIG. 5 is a functional block diagram of an SOC for an input device in a console gaming system that includes wireless LAN functionality and power savings modes.

Referring now to FIG. 5, a system-on-chip (SOC) 52 for a wireless input device 44 according to the present invention includes both user interfaces 54 and console interfaces 56 with wireless LAN functionality. The user interfaces 54 include a key scan interface 58, a joystick detect interface 60, and a motor control interface 62 and communicate with a central processing unit (CPU) subsystem 64. The console interfaces 56 include a wired interface 66 and an infrastructure mode wireless LAN interface 68. The wireless LAN interface 68 and the wired interface 66 communicate with the processor device 64 via an internal communications bus 70 that is managed by a bus arbiter 72. The wireless LAN interface 68 communicates with the console 42 via an RF transceiver that may also be located on-chip. The wired interface 66 communicates with the console 42 via a USB, UART, or another wired interface.

The wired interface 66 may also be used as part of a battery charging system for the wireless input device 44. For example, if a battery in the wireless input device 44 becomes discharged, a user may connect the wireless input device 44 to the console 42 through the wired interface 66 to charge the battery. Additionally, the user may continue to operate the wireless input device 44 as normal while the battery charges. Integrating a wireless LAN SOC on an existing input device SOC is both difficult and expensive. Therefore, providing both modules on a single SOC 52 reduces both cost and power.

Figure 6:
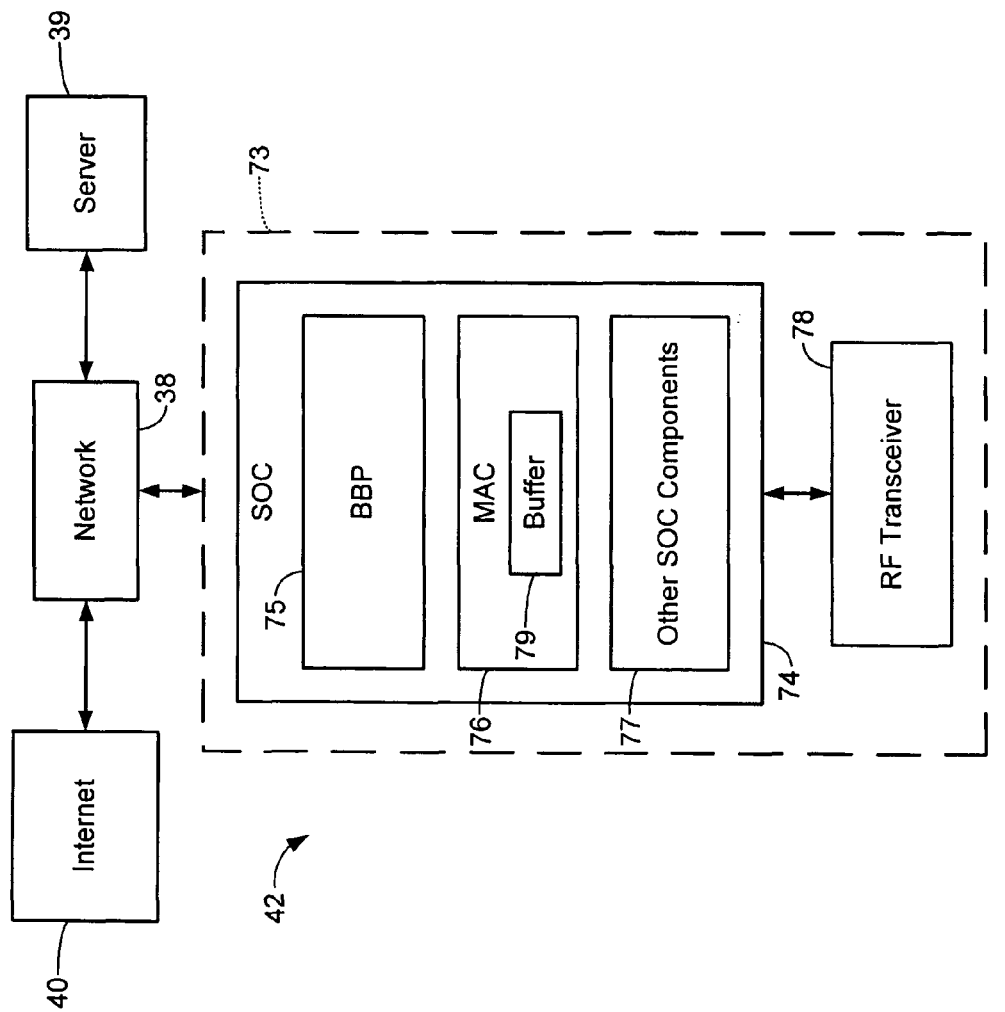
FIG. 6 is a functional block diagram of an AP for a console in a console gaming system that includes an SOC and a radio frequency (RF) transceiver.

Referring now to FIG. 6, an exemplary access point (AP) 73 for a console 42 includes an SOC 74. The SOC 74 includes a baseband processor (BBP) 75, a media access control (MAC) device 76, and other SOC components, identified collectively at 77, including interfaces, memory, and/or processors. A radio frequency (RF) transceiver 78 communicates with the MAC device 76. The RF transceiver 78 transmits/receives data to/from client stations in the wireless LAN. Since the AP 73 may have data that is intended for the client stations during the low power mode, the MAC device 76 includes a buffer 79. The MAC device 76 stores data that is intended for the client stations in the buffer 79 until the client stations enter the active mode. As illustrated in FIG. 3, the AP 73 may be a node in a network 38 that includes other nodes such as a server 39 and may be connected to a distributed communications system 40 such as the Internet.

The wireless network devices according to the present invention preferably reduce power consumption using the low power savings approach that is set forth in "Power Savings Apparatus and Method For Wireless Network Devices", U.S. patent application Ser. No. 10/650,887, filed on Aug. 28, 2003, which is hereby incorporated by reference in its entirety. Skilled artisans will appreciate, however, that the wireless infrastructure power savings approach according to the present invention may use any suitable power savings approach.

Figure 7:
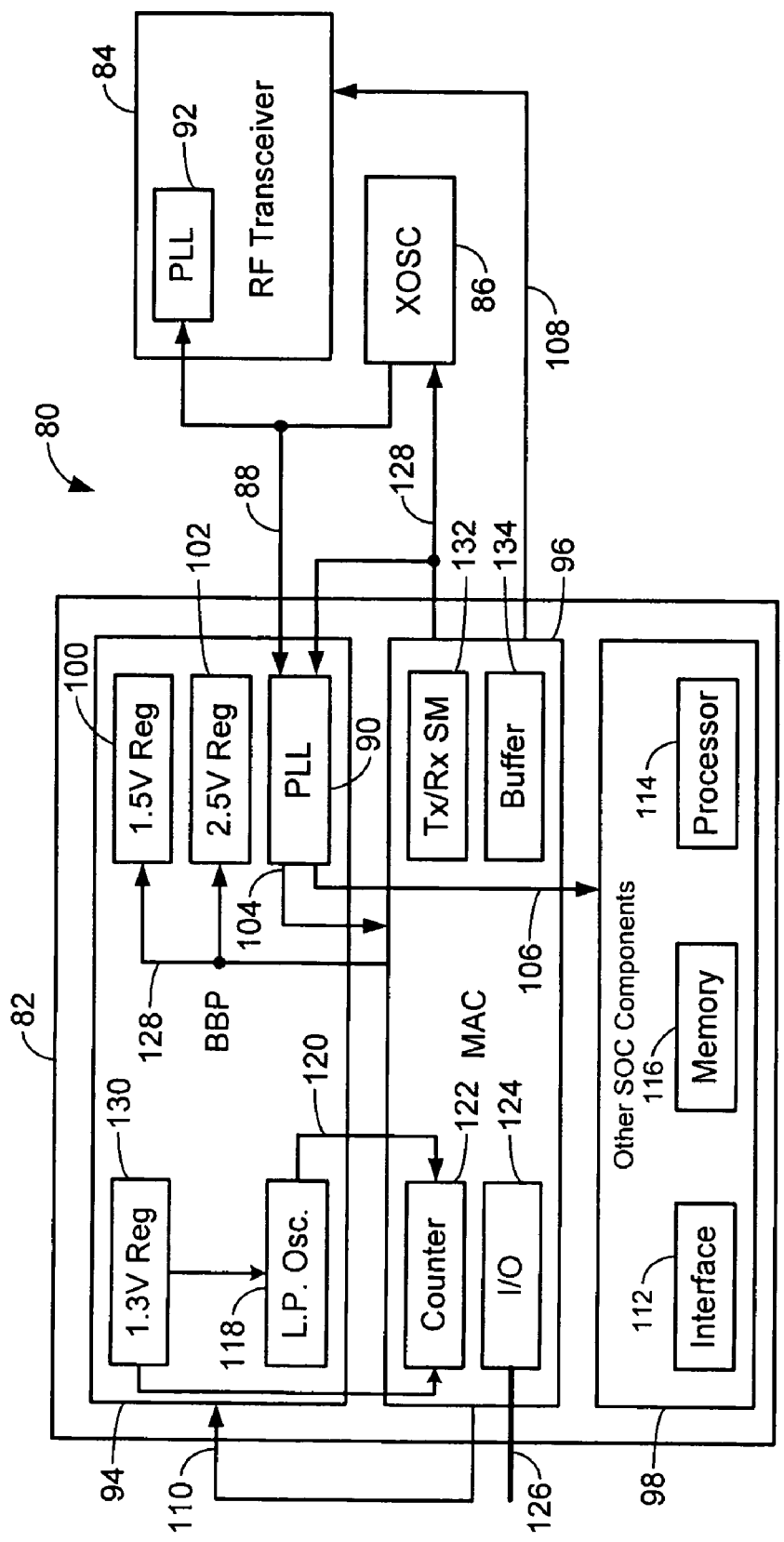
FIG. 7 is a functional block diagram of a client station that implements a wireless infrastructure power savings mode.

Referring now to FIG. 7, the wireless LAN interface 68 according to the present invention includes a wireless network communications device 80 that operates in two power modes. In an active mode, the wireless network communications device 80 processes incoming and outgoing data. In the low power mode, the wireless network communications device 80 does not transmit or receive data. In one implementation, the wireless network communications device 80 includes an SOC circuit 82, an external radio frequency (RF) transceiver 84, and a crystal oscillator (XOSC) 86. The crystal oscillator 86 can be located externally or the amplifier portion of the crystal oscillator 86 can be integrated with the SOC circuit 82 and the crystal portion of the crystal oscillator 86 can be located externally.

The RF transceiver 84 wirelessly transmits/receives data to/from other wireless transceivers. The XOSC 86 provides a reference signal 88 to first and second phase-locked loops (PLLs) 90 and 92, respectively. The first PLL 90 is located in the SOC circuit 82 and the second PLL 92 is located in the RF transceiver 84. The first and second PLLs 90 and 92, respectively, generate clock signals that are based on the reference signal 88 from the XOSC 86. For example, the XOSC 86 may provide a reference signal at a frequency of 44 MHz, although other frequencies may be used. The SOC 50 and/or the RF transceiver 84 may include multiple PLLs if desired to generate additional clock signals.

In one implementation, the SOC circuit 82 includes a baseband processor (BBP) 94, a media access control (MAC) device 96, and other SOC components 98. The BBP 94 includes a digital voltage regulator 100, an analog voltage regulator 102, and the first PLL 90. The digital and analog voltage regulators 100 and 102, respectively, supply regulated voltages to one or more components in the SOC circuit 82. For example, the digital voltage regulator 100 may operate at 1.5V and the analog voltage regulator 102 may operate at 2.5V. Additional analog and/or digital voltage regulators and/or voltage regulators operating at other voltages may be employed. The first PLL 90 generates one or more clock signals 104 for the MAC device 96, one or more clock signals 106 for the other SOC components 98 and one or more clock signals for the BBP 94 based on the reference signal 88 from the XOSC 86.

The MAC device 96 transmits a transceiver mode signal 108 to the RF transceiver 84. The transceiver mode signal 108 instructs the RF transceiver 84 to operate in the active mode or the low power mode. The transceiver mode signal 108 also informs the RF transceiver 84 whether it is transmitting or receiving RF signals during the active mode. The RF transceiver 84 remains deactivated during the low power mode and does not transmit or receive RF signals. Preferably, the RF transceiver 84 is completely shut down for maximum power reduction. However, during the low power mode, the RF transceiver 84 may utilize a small amount of power to ensure a quick transition from the low power mode to the active mode.

The MAC device 96 also transmits a BBP mode signal 110 to the BBP 94. The BBP mode signal 110 instructs the BBP 94 to operate in the active mode or the low power mode. The other SOC components 98 include a host interface 112, a processor 114, and memory 116. The host interface 112 provides an interface such as peripheral component interconnect (PCI) interface or other suitable interfaces. The host interface 112 may be connected to a host. The processor 114 may be an Advanced RISC Machine (ARM) processor and/or any other processor. The memory 116 stores data.

The duration that the wireless network communications device 80 operates in the low power mode varies. The duration depends on the position that the client station including the wireless network communications device 80 holds in the station access sequence. If the wireless network communications device 80 is not triggered during the low power mode by an external or host wakeup signal, it returns to the active mode before the start of the next beacon. The XOSC 86 consumes a significant amount of power during the active mode. For example, the XOSC 86 may consume 10-12 mA of current. Therefore, the MAC device 96 deactivates the XOSC 86 during the low power mode.

The BBP 94 includes a low power oscillator 118 that provides a signal 120 to a counter 122 in the MAC device 96. For example, the low power oscillator 118 may be implemented either internally (as shown) or externally and may operate at a frequency of 100 kHz. The counter 122 determines when the wireless network communications device 80 wakes from the low power mode prior to a beacon interval. The low power oscillator 118 is typically susceptible to performance deviations due to temperature variances. Therefore, before the wireless network communications device 80 enters the low power mode, the processor 114 optionally calibrates the low power oscillator 118 using the XOSC 86 to ensure that the low power oscillator 118 accurately tracks the desired low power time period.

Optionally, hardware in the MAC device 96 can continually calibrate the low power oscillator 118 whenever the wireless network communications device 80 is in the active mode. The calibration may be performed every time that the low power mode occurs, periodically, randomly, on an event basis or using any other criteria. Alternately, the MAC, the BBP 94 and/or any other suitable system component can perform the calibration of the low power oscillator 118.

For example, the processor 114 may measure the difference between the frequency of the low power oscillator 118 and the frequency of the XOSC 86. Based on the frequency difference, the processor 114 determines the number of times that the counter 122 must increment or decrement to equal a desired period. The XOSC 86 can also calibrate the low power oscillator 118 on a periodic basis.

The MAC device 96 includes an input/output (I/O) module 124, which may be located outside of the MAC in the SOC circuit 82. For example, the I/O module 124 may be a general purpose I/O module (GPIO). In the event that a client station requires the wireless network communications device 80 to return to the active mode, the client station triggers an I/O input 126. If the I/O input 126 is triggered during the low power mode, the wireless network communications device 80 returns to the active mode.

Some host interfaces such as a compact flash card may not include a signal to trigger the I/O module 124. In that case, the processor 114 generates an interrupt when the wireless network communications device 80 returns to the active mode. The interrupt queries the host to determine whether the host has data to transmit. Alternatively, some host interfaces 112 may include a command that can be executed when the wireless network communications device 80 is in the low power mode that will cause the wireless network communications device 80 to return to the active mode.

Before entering the low power mode, the processor 114 optionally calibrates the low power oscillator 118 using signals generated by the XOSC 86. ° Optionally, hardware in the MAC device 96 can continually calibrate the low power oscillator 118 using signals generated by the XOSC 86 whenever the wireless network communications device 80 is in the active mode. The MAC device 96 instructs the BBP 94, the RF transceiver 84 and the PLL to enter the low power mode. The MAC device 96 disables internal clocks in the SOC circuit 82. The MAC device 96 next disables the first PLL 90, then the XOSC 86 and voltage regulators 100 and 102 with disable signals 128.

Since the MAC device 96 disables the digital voltage regulator 100 during the low power mode, the BBP 94 includes a low power digital voltage regulator 130. The low power digital voltage regulator 130 dissipates less power than the other voltage regulators 100 and 102. For example, the low power digital voltage regulator 130 may operate at 1.3 V and with a lower current level than the other regulators 100 and 102. The low power digital voltage regulator 130 provides power for the low power oscillator 118 and the counter 122 during the low power mode. The low power voltage regulator also supplies power to registers and memories in the SOC circuit 82 so that the state of the SOC circuit 82 is retained, which is important for fast wake up time. The MAC device 96 also includes transmit and receive state machines 132 and a transmit buffer 134.

During the low power mode, the I/O module 124 monitors the I/O input 126. Additionally, the I/O module 124 may monitor the host interface 112. If the I/O input 126 or the host interface 112 wake command is not triggered during the low power mode, the wireless network communications device 80 returns to the high power mode after the counter 122 reaches the end of the low power period. In order to return to the active mode, the MAC device 96 enables the voltage regulators 100 and 102 and the XOSC 86. The MAC device 96 activates the first PLL 90. The MAC device 96 next enables the internal clocks 104 and 106. Finally, the MAC device 96 instructs the BBP 94 and the RF transceiver 84 to operate in the active mode.

Figure 8:
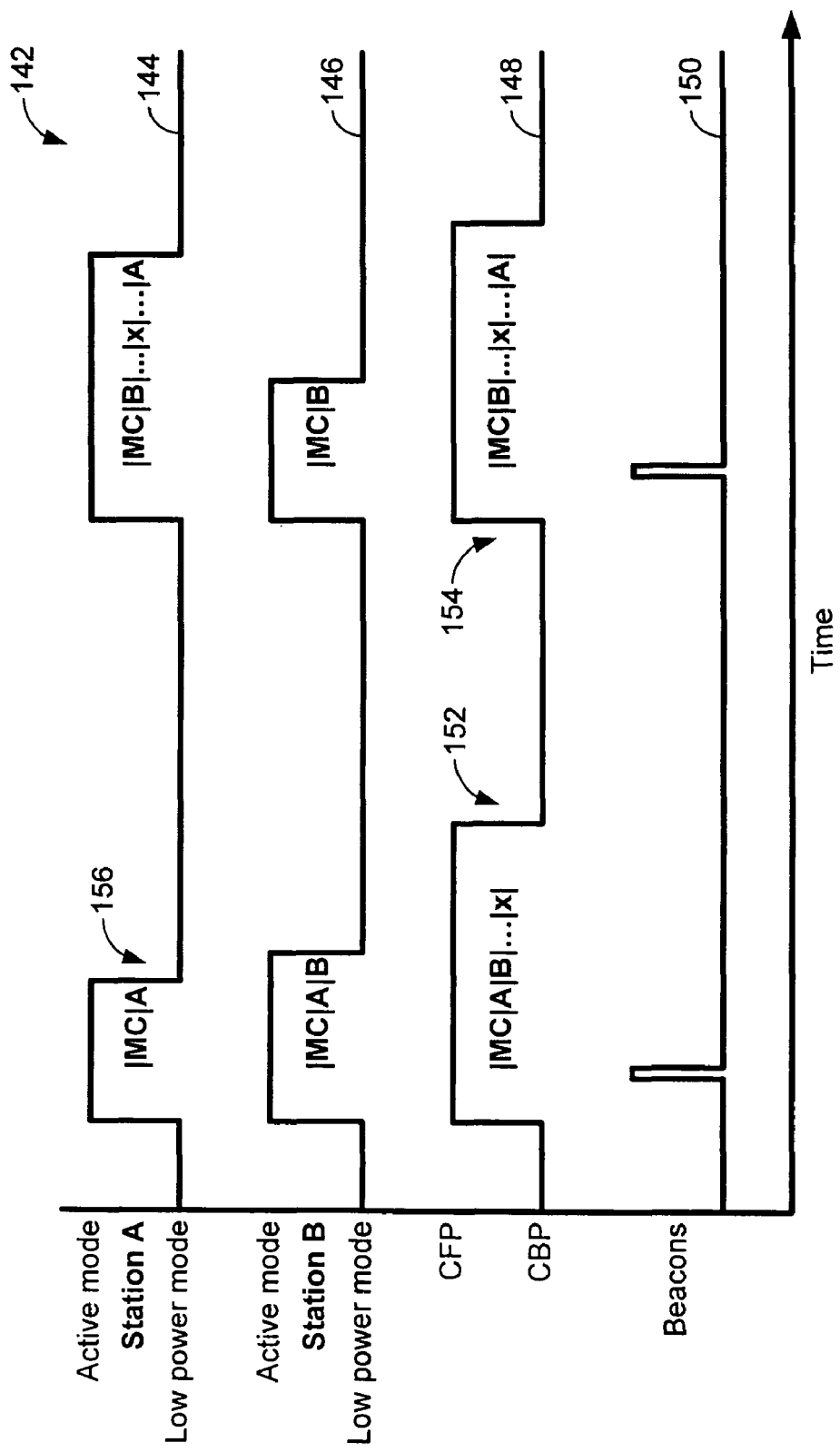
FIG. 8 is a timing diagram that illustrates operating modes of client stations in an infrastructure mode wireless LAN according to the present invention.

Referring now to FIG. 8, an exemplary timing diagram 142 according to the present invention is illustrated. A first station mode signal 144 identifies active and low power modes of a first client station. A second station mode signal 146 identifies active and low power modes of a second client station. A contention period signal 148 identifies when a wireless network that includes the first and second client stations operates in a contention free period (CFP) and a contention based period (CBP). A beacon transmission signal 150 illustrates an exemplary beacon transmission pattern.

Before the AP 73 sends out a beacon transmission, the AP 73 determines whether other devices are currently transmitting data so that other devices are able to use the network. The AP 73 transmits a beacon at the target beacon transmission time (TBTT) according to 802.11 standards. The first and second client stations transition to the active mode prior to a beacon transmission to queue frames to transmit to the access point (AP) in a buffer. Immediately following a beacon transmission, the AP 73 transmits existing multicast or broadcast frames to the first and second client stations. The AP 73 varies a station access sequence for the first and second client stations. In a first CFP, illustrated at 152, the AP 73 accesses the first client station and then the second client station. In a second CFP, illustrated at 154, the AP 73 accesses the second client station first and the first client station last. During a CFP, there is no competition for the medium since the station access sequence is predetermined.

As illustrated at 156, the first client station transitions to the low power mode after transmitting frames to the AP 73. Since the station access sequence varies following each beacon interval, the first and second client stations consume approximately the same average power over time. If there is time remaining in the CFP after all client stations have transmitted frames to the AP 73, the AP 73 may send out a CF-End frame to inform other wireless devices that the AP 73 is available. The AP 73 then operates as an 802.11 AP according to standard until the next beacon transmission.

Figure 9:
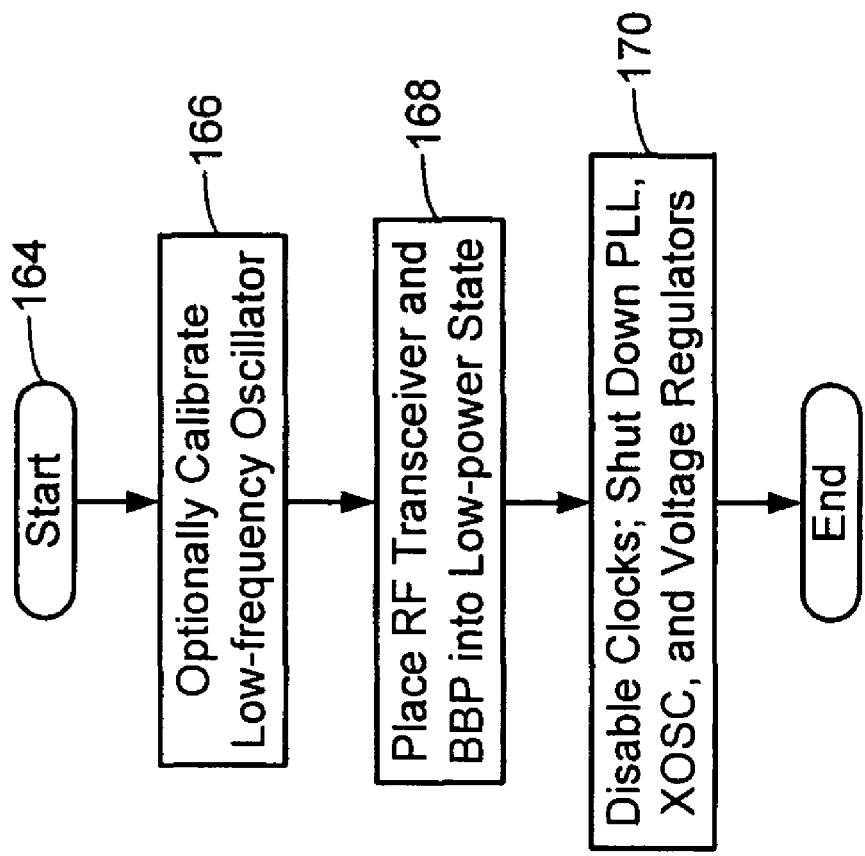
FIG. 9 is a flowchart illustrating steps performed by the client station to enter the wireless infrastructure power savings mode.

Referring now to FIG. 9, an infrastructure mode shutdown algorithm begins in step 164. In step 166, the processor 114 optionally calibrates the low power oscillator 118 using signals generated by the XOSC 86. In step 168, the RF transceiver 84 and the BBP 94 are transitioned to the low power state or mode. In step 170, the internal clocks are disabled and the PLLs, the XOSC 86 and the voltage regulators are shut down and control ends.

Figures 10A, 10B:
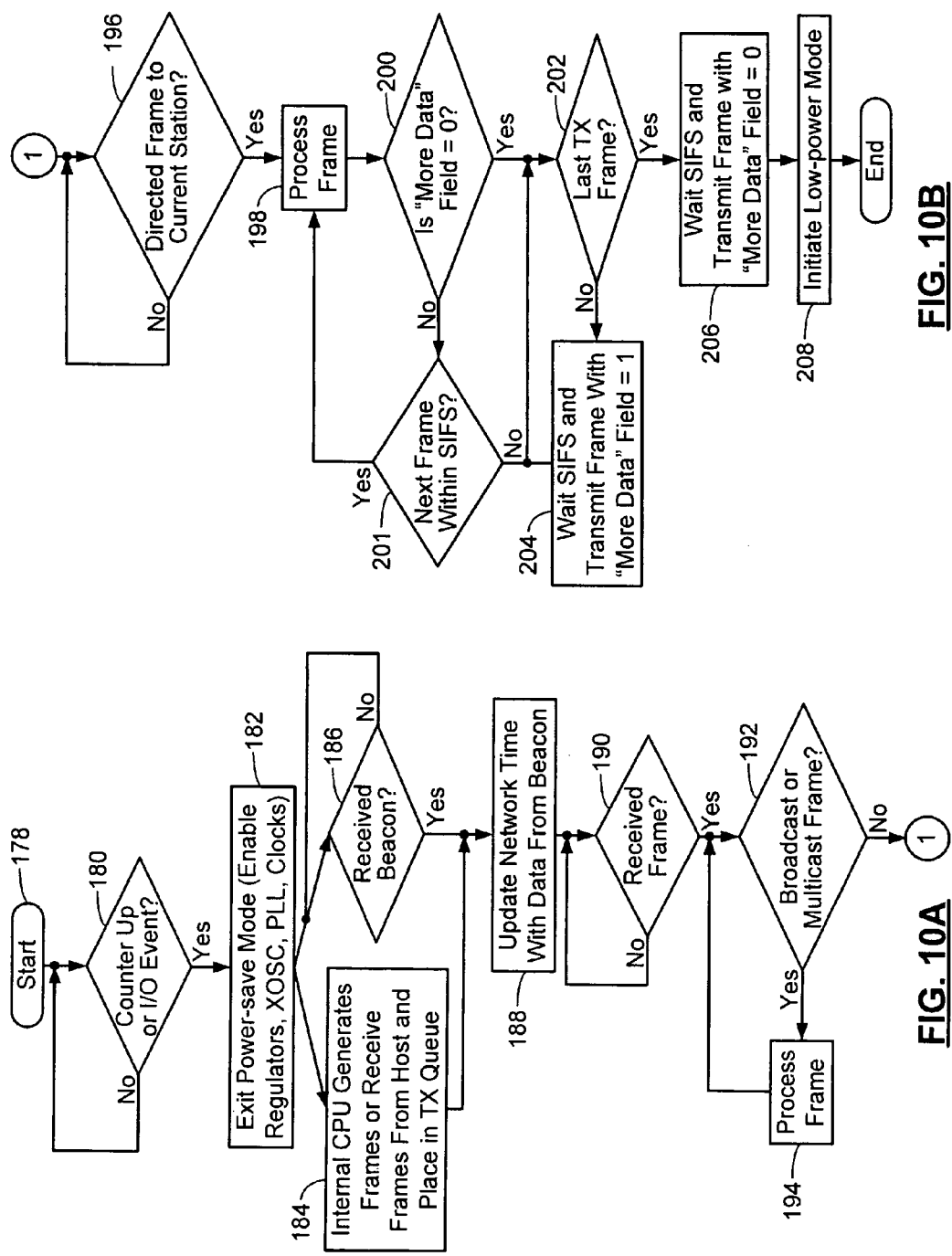
FIGS. 10A and 10B are flowcharts illustrating steps performed by the client station to exit the wireless infrastructure power savings mode according to the present invention.

Referring now to FIGS. 10A and 10B, an active mode algorithm for the wireless network communications device 80 begins in step 178. Before step 178, the wireless network communications device 80 is assumed to be operating in the low power mode. In step 180, control determines whether the counter 122 has expired or whether an I/O event has taken place. If false, control loops to step 180. If true, control proceeds to step 182. In step 182, the client station transitions to the active mode. Steps 184 and 186 are executed in parallel.

In step 184, the MAC device 96 queues frames from a host or creates frames if the SOC Processor 114 is acting as the host, and places them in the buffer 134. In step 186, control determines whether a beacon transmission was received. If false, control loops to step 186. If true, control proceeds to step 188.

Both steps 184 and 186 proceed to step 188. In step 188, the MAC device 96 updates a network time based on the beacon transmission. In step 190, control determines whether the RF transceiver 84 received a frame from the AP 73. If false, control loops to step 190. If true, control proceeds to step 192. In step 192, control determines whether the received frame is a multicast or broadcast frame. If true, the MAC processes the frame in step 194 and control returns to step 192. If false, control proceeds to step 196. In step 196, control determines whether the frame is a directed frame to this station. If true, control proceeds to step 198. If false, control loops to step 196.

In step 198, the MAC device 96 processes the directed frame and control proceeds to step 200. In step 200, control determines whether the "more data" field of the frame is equal to 0. If false, control proceeds to step 201. If true, control proceeds to step 202. In step 201, control determines if the next frame arrives within a SIFS interval plus some margin. If true, control returns to step 198. If false, control proceeds to step 202. In step 202, control determines whether the next frame is the last frame to transmit to the AP 73. If false control proceeds to step 204. If true, control proceeds to step 206. In step 204, the wireless network communications device 80 waits a SIFS interval and transmits the frame with the "more data" field equal to 1. In step 206, the wireless network communications device 80 waits a SIFS interval and transmits the frame with the "more data" field equal to 0. In step 208, the MAC device 96 transitions the client station to the low power mode and control ends.

Figure 11:
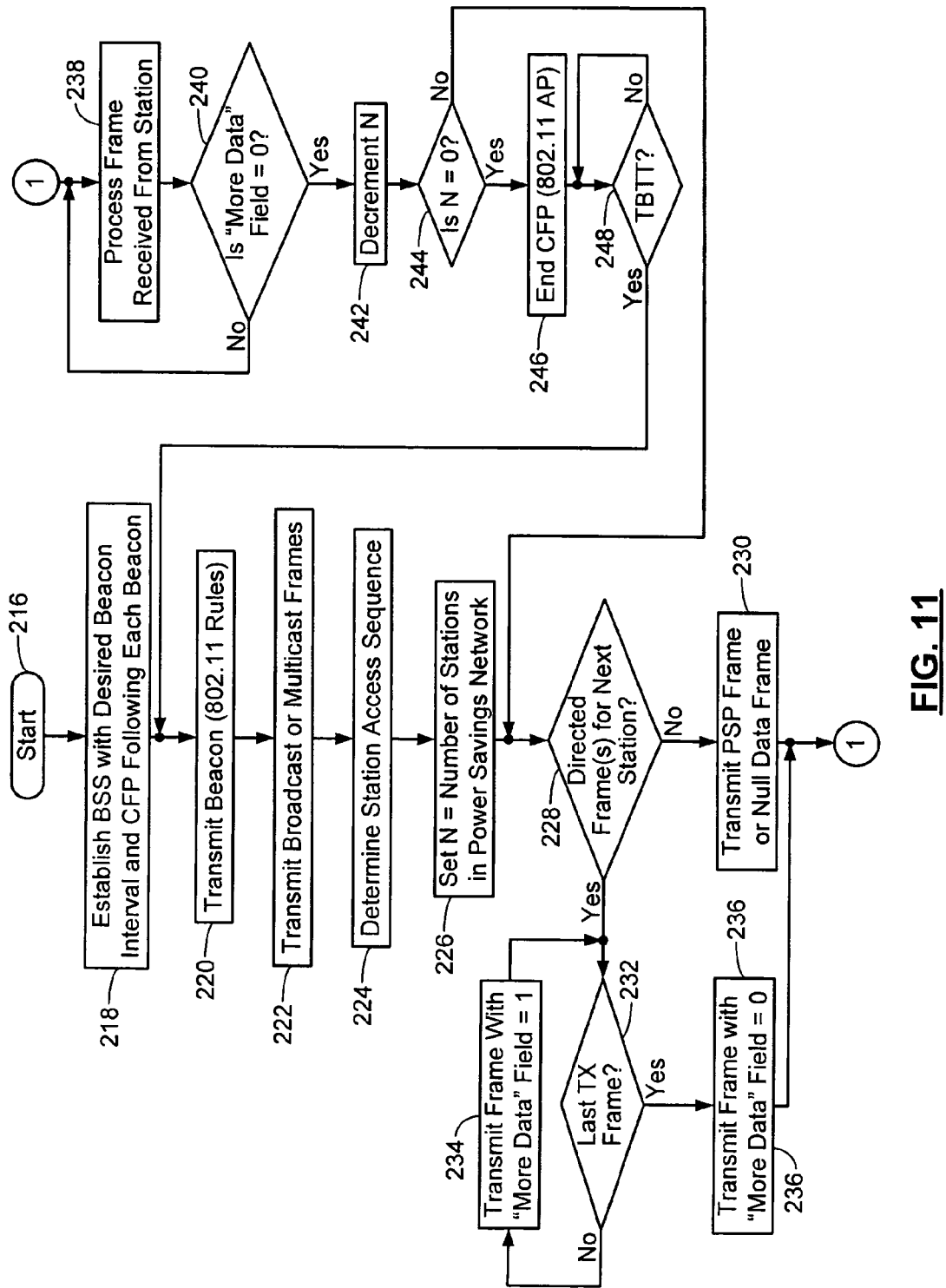
FIG. 11 is a flowchart illustrating steps performed by an AP in an infrastructure mode wireless LAN according to the present invention.

Referring now to FIG. 11, an AP algorithm begins in step 216. In step 218, the AP 73 established a basic service set (BSS) with a desired beacon interval and a contention free period (CFP) following each beacon transmission. In step 220, the AP 73 transmits a beacon. In step 222, the AP 73 transmits existing multicast or broadcast frames. In step 224, the AP 73 determines the station access sequence. In step 226, control sets N equal to the number of client stations in the power savings network. In step 228, control determines whether the are directed frames for the next client station. If false, control proceeds to step 230. If true, control proceeds to step 232. In step 230, the AP 73 transmits a null data frame to the current client station. In step 232, control determines whether the current directed frame is the last frame for the client station. If false, control proceeds to step 234. If true, control proceeds to step 236.

In step 234, the AP 73 transmits the frame with the "more data" field equal to 1 and control returns to step 232. In step 236, the AP 73 transmits the frame with the "more data" field equal to 0. Control proceeds from both steps 230 and 236 to step 238. In step 238, the AP 73 processes a frame received from the current station. In step 240, control determines whether the "more data" field of the frame is equal to 0. If false, control returns to step 238. If true, control proceeds to step 242. In step 242, control decrements N. In step 244, control determines whether N is equal to 0. If false, control returns to step 228. If true, control proceeds to step 246. In step 246, the AP 73 ends the CFP and operates as a standard 802.11 AP until the next beacon transmission. In step 248, control determines whether the current time is the target beacon transmission time (TBTT). If false, control loops to step 248. If true, control returns to step 220.

The present invention provides for increased power savings in an infrastructure mode wireless network. The present invention eliminates the need for a power save frame exchange and the amount of time a client station spends in an active mode is decreased. Client stations transmit data faster by only executing a SIFS prior to transmitting a frame and the AP 73 immediately transmits multicast and broadcast frames following a beacon transmission. Furthermore, utilizing wireless LAN connectivity in input devices for console gaming systems simplifies operation since many conventional console gaming systems offer Internet connectivity according to IEEE 802.11 standards.

While the present invention has been described in the context of IEEE §§802.11, 802.11(a), 802.11(b) and 802.11(g), the present invention has application to other current and future wireless protocols.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A client station that communicates with an access point (AP) in a wireless local area network (LAN), the client station comprising:
    a media access control (MAC) device configured to control transitions between an active mode and a low power mode;
    a radio frequency (RF) transceiver configured to communicate with the MAC device,
    wherein subsequent to the MAC device transitioning the client station to the active mode, the RF transceiver is configured to transmit data to the AP when at least one of (i) the AP finishes transmitting directed data to the RF transceiver and (ii) the AP transmits a null data frame to the RF transceiver, and
    wherein the MAC device is configured to transition the client station to the low power mode when the RF transceiver finishes transmitting data to the AP;
    a first voltage regulator configured to regulate supply voltage during the active mode, wherein the first voltage regulator is powered down during the low power mode;
    a second voltage regulator configured to dissipate less power than the first voltage regulator, wherein the second voltage regulator is configured to supply voltage during the low power mode,
    wherein the MAC device is configured to select (i) the first voltage regulator during the active mode and (ii) the second voltage regulator during the low power mode;
    a baseband processor (BBP) configured to (i) perform radio frequency mixing and (ii) communicate with the MAC device and the RF transceiver;
    a first phase locked loop (PLL) configured to generate a first clock signal for the BBP during the active mode; and
    a crystal oscillator configured to output a timing signal to the first PLL during the active mode,
    wherein the RF transceiver is in communication with the BBP and includes a second PLL configured to (i) receive the timing signal from the crystal oscillator during the active mode and (ii) generate a second clock signal for the RF transceiver.

2. The client station of claim 1, wherein the AP uses at least one of (i) a random order and (ii) a rotating order to access the client station.

3. The client station of claim 1, wherein (i) subsequent to the MAC device transitioning the client station to the active mode and (ii) prior to the RF transceiver receiving a timing beacon from the AP, the MAC device is configured to (i) query a host for frames to transmit to the AP and (ii) store the frames.

4. The client station of claim 3, further comprising an internal processor configured to (i) support host functionality and (ii) generate the frames.

5. The client station of claim 1, wherein the MAC device is configured to (i) transition the client station to the active mode prior to a first timing beacon from the AP and (ii) transition the client station to the low power mode prior to a subsequent timing beacon from the AP.

6. The client station of claim 5, wherein the MAC device is configured to update network time based on the first timing beacon.

7. The client station of claim 6, wherein the network time is set equal to a prior beacon time plus a beacon interval minus a fixed delay.

8. A system comprising:
the client station of claim 5; and
the AP, wherein the AP is configured to transmit one of (i) multicast frames and (ii) broadcast frames to the RF transceiver subsequent to transmitting the first timing beacon.

9. The client station of claim 1, wherein the RF transceiver is configured to transmit at least one frame to the AP following a short interframe space (SIFS).

10. A system comprising:
the client station of claim 1; and
the AP, wherein the AP is configured to establish a basic service set (BSS), and wherein the BSS includes (i) a contention free period (CFP) that follows a timing beacon and (ii) a contention base period (CBP) that follows the CFP.

11. The system of claim 10, wherein client stations in a restricted network communicate with the AP during the CFP, and wherein the client stations in the restricted network include the client station of claim 1.

12. The system of claim 11, wherein the AP communicates with at least one wireless device that is external to the restricted network during the CBP.

13. A system comprising:
the client station of claim 1; and
the AP, wherein the AP is configured to transmit a null data frame to the RF transceiver when the AP has zero directed frames to transmit to the RF transceiver.

14. The client station of claim 1, further comprising a first oscillator configured to generate a third clock signal during the low power mode, wherein the first oscillator is configured to dissipate less power than the crystal oscillator.

15. The client station of claim 1, wherein when the MAC device initiates the low power mode, at least one of (i) the first voltage regulator, (ii) the RF transceiver, the first PLL, (iii) the second PLL or (iv) the crystal oscillator is shut down.

16. The client station of claim 14,
wherein the MAC device includes a counter,
wherein when the MAC device initiates the low power mode, the second voltage regulator is configured to power the first oscillator and the counter, and
wherein when the counter reaches a predetermined count, the MAC device is configured to power up at least two of (i) the crystal oscillator, (ii) the first voltage regulator, (iii) the RF transceiver, (iv) the first PLL and (v) the second PLL.

17. The client station of claim 14, further comprising a processor configured to (i) communicate with the crystal oscillator and (ii) calibrate the first oscillator using the timing signal from the crystal oscillator.

18. The client station of claim 1, wherein at least two of (i) the BBP, (ii) the first voltage regulator, (iii) the second voltage regulator, (iv) the RF transceiver, (v) the MAC device, and (vi) the first PLL are implemented by a system on chip (SOC).

19. The client station of claim 1, wherein the client station is otherwise compliant with at least one of IEEE section 802.11, 802.11(a), 802.11(b), or 802.11(g).

20. The client station of claim 1, wherein the wireless LAN is an infrastructure network.

21. The client station of claim 1, wherein the client station is in an infrastructure network.

22. A wireless local area network (LAN), comprising:
an access point (AP);
a first client station (i) configured to selectively operate in a low power mode and an active mode and (ii) subsequent to transitioning to the active mode, is in communication with the AP; and
a second client station (i) configured to selectively operate in the low power mode and the active mode and (ii) subsequent to transitioning to the active mode, is in communication with the AP,
wherein the AP uses at least one of a random order or a rotating order to access the first client station and the second client station,
wherein when the AP accesses the first client station prior to the second client station, the first client station is configured to transition to the low power mode prior to the AP completing access of the second client station,
wherein the first client station comprises
a first voltage regulator configured to regulate supply voltage during the active mode, wherein the first voltage regulator is powered down during the low power mode;
a second voltage regulator configured to dissipate less power than the first voltage regulator, wherein the second voltage regulator is configured to supply voltage during the low power mode;
a media access control (MAC) device configured to select (i) the first voltage regulator during the active mode and (ii) the second voltage regulator during the low power mode;
a baseband processor (BBP) configured to (i) perform radio frequency mixing and (ii) communicate with the MAC device and a radio frequency (RF) transceiver;
a first phase locked loop (PLL) configured to generate a first clock signal for the BBP during the active mode; and
a crystal oscillator configured to output a timing signal to the first PLL during the active mode,
wherein the RF transceiver is in communication with the BBP and includes a second PLL configured to (i) receive the timing signal from the crystal oscillator during the active mode and (ii) generate a second clock signal for the RF transceiver.

23. The wireless LAN of claim 22, wherein the first client station includes:

a first media access control (MAC) device configured to control transitions between the active mode and the low power mode; and a first radio frequency (RF) transceiver (i) in communication with the first MAC device and (ii) subsequent to the first MAC device transitioning the first client station to the active mode, configured to transmit data to the AP when at least one of (i) the AP finishes transmitting directed data to the first RF transceiver or (ii) the AP transmits a null data frame to the first RF transceiver, wherein the first MAC device is configured to transition the first client station to the low power mode when the first RF transceiver finishes transmitting data to the AP.

24. The wireless LAN of claim 23, wherein the second client station includes:

a second MAC device configured to control transitions between the active mode and the low power mode; and a second RF transceiver (i) in communication with the second MAC device and (ii) subsequent to the second MAC device transitioning the second client station to the active mode, configured to transmit data to the AP when at least one of (i) the AP finishes transmitting directed data to the second RF transceiver and (ii) the AP transmits a null data frame to the second RF transceiver, wherein the second MAC device is configured to transition the second client station to the low power mode when the second RF transceiver finishes transmitting data to the AP.

25. The wireless LAN of claim 23, wherein the first MAC device is configured to (i) transition the first client station to the active mode prior to a first timing beacon from the AP and (ii) transition the first client station to the low power mode prior to a subsequent timing beacon from the AP.

26. The wireless LAN of claim 25, wherein the first MAC device updates network time based on the first timing beacon.

27. The wireless LAN of claim 26, wherein the network time is set equal to a prior beacon time plus a beacon interval minus a fixed delay.

28. The wireless LAN of claim 23, wherein the first RF transceiver is configured to transmit at least one frame to the AP following a short interframe space (SIFS).

29. The wireless LAN of claim 22, wherein the first client station and the second client station are otherwise compliant with at least one of IEEE section 802.11, 802.11(a), 802.11(b), or 802.11(g).

30. The wireless LAN of claim 22, wherein the wireless LAN is an infrastructure network.

31. The wireless LAN of claim 22, wherein the first client station and the second client station are client stations in an infrastructure network.

32. The wireless LAN of claim 22, wherein (i) subsequent to the first client station and the second client station transitioning to the active mode and (ii) prior to the first client station and the second client station receiving a timing beacon from the AP, at least one of the first client station and the second client station storing frames to transmit to the AP.

33. The wireless LAN of claim 25, wherein the AP is configured to transmit one of multicast frames and broadcast frames to the first client station and the second client station immediately subsequent to transmitting the first timing beacon.

34. The wireless LAN of claim 22, wherein the AP is configured to establish a basic service set (BSS), and wherein the BSS includes (i) a contention free period (CFP) that follows a timing beacon and (ii) a contention base period (CBP) that follows the CFP.

35. The wireless LAN of claim 34, wherein only client stations in a restricted network are in communication with the AP during the CFP, and wherein the client stations in the restricted network include the first client station and the second client station.

36. The wireless LAN of claim 35, wherein the AP is in communication with at least one wireless device, wherein the at least one wireless device is external to the restricted network during the CBP.

37. The wireless LAN of claim 23, wherein the AP is configured to transmit the null data frame to the first RF transceiver when the AP does not have directed frames to transmit to the first RF transceiver.

38. A client station configured to communicate with an access point (AP) in a wireless local area network (LAN), the client station comprising:

media access controlling means for controlling transitions between an active mode and a low power mode;

radio frequency transceiving means for (i) transmitting and receiving radio frequency signals and (ii) for communicating with the media access controlling means, wherein subsequent to the media access controlling means transitioning the client station to the active mode, the radio frequency transceiving means transmits data to the AP when at least one of (i) the AP finishes transmitting directed data to the radio frequency transceiving means and (ii) the AP transmits a null data frame to the radio frequency transceiving means, and wherein the media access controlling means transitions the client station to the low power mode when the radio frequency transceiving means finishes transmitting data to the AP;

first voltage regulating means for regulating supply voltage during the active mode, wherein the first voltage regulating means is powered down during the low power mode;

second voltage regulating means (i) for dissipating less power than the first voltage regulating means and (ii) for regulating supply voltage during the low power mode, wherein the media access controlling means selects (i) the first voltage regulating means during the active mode and (ii) the second voltage regulating means during the low power mode;

baseband processing means for performing radio frequency mixing and for communicating with the media access controlling means and the radio frequency transceiving means;

first means for generating a first clock signal for the baseband processing means during the active mode; and first means for outputting a timing signal to the first means during the active mode, wherein the radio frequency transceiving means communicates with the baseband processing means and includes second means (i) for receiving the timing signal during the active mode and (ii) for generating a second clock signal.

39. The client station of claim 38, wherein the AP uses at least one of a random order or a rotating order to access the client station.

40. The client station of claim 38, wherein (i) subsequent to the media access controlling means transitioning the client station to the active mode and (ii) prior to the radio frequency transceiving means receiving a timing beacon from the AP, the media access controlling means (i) queries a host for frames to transmit to the AP and (ii) stores the frames.

41. The client station of claim 40, further comprising internal processing means for supporting host functionality and for generating the frames.

42. The client station of claim 38, wherein the media access controlling means (i) transitions the client station to the active mode prior to a first timing beacon from the AP and (ii) transitions the client station to the low power mode prior to a subsequent timing beacon from the AP.

43. The client station of claim 42, wherein the media access controlling means updates network time based on the first timing beacon.

44. The client station of claim 43, wherein the network time is set equal to a prior beacon time plus a beacon interval minus a fixed delay.

45. A system comprising:
the client station of claim 42; and
the AP, wherein the AP transmits one of multicast frames and broadcast frames to the radio frequency transceiving means subsequent to transmitting the first timing beacon.

46. The client station of claim 38, wherein the radio frequency transceiving means transmits at least one frame to the AP following a short interframe space (SIFS).

47. A system comprising:
the client station of claim 38; and
the AP, wherein the AP establishes a basic service set (BSS) that includes (i) a contention free period (CFP) that follows a timing beacon and (ii) a contention base period (CBP) that follows the CFP.

48. The system of claim 47, wherein only client stations in a restricted network communicate with the AP during the CFP, and wherein the client stations in the restricted network include the client station of claim 38.

49. The system of claim 48, wherein the AP communicates with at least one wireless device that is external to the restricted network during the CBP.

50. A system comprising:
the client station of claim 38; and
the AP, wherein the AP transmits a null data frame to the radio frequency transceiving means when the AP has zero directed frames to transmit to the radio frequency transceiving means.

51. The client station of claim 38, further comprising second oscillating means for generating a third clock signal during the low power mode, wherein the second oscillating means dissipates less power than the first oscillating means.

52. The client station of claim 38, wherein when the media access controlling means initiates the low power mode, at least one of (i) the first voltage regulating means, (ii) the radio frequency transceiving means, (iii) the first means, (iv) the second means or (v) the first oscillating means is shut down.

53. The client station of claim 51, wherein the media access controlling means includes counting means for counting,
wherein when the media access controlling means initiates the low power mode, the second voltage regulating means powers (i) the second oscillating means and (ii) the counting means, and
wherein when the counting means reaches a predetermined count, the media access controlling means powers up at least two of (i) the first oscillating means, (ii) the first voltage regulating means, (iii) the radio frequency transceiving means, (iv) the first means and (v) the second means.

54. The client station of claim 51, further comprising processing means (i) for communicating with the first oscillating means and (ii) for calibrating the second oscillating means using the timing signal from the first oscillating means.

55. The client station of claim 38, wherein at least two of (i) the baseband processing means, (ii) the first voltage regulating means, (iii) the second voltage regulating means, (iv) the radio frequency transceiving means, (v) the media access controlling means, and (vi) the first means are implemented by a system on chip (SOC).

56. The client station of claim 38, wherein the client station is otherwise compliant with at least one of IEEE section 802.11, 802.11(a), 802.11(b), or 802.11(g).

57. The client station of claim 38, wherein the wireless LAN is an infrastructure network.

58. The client station of claim 38, wherein the client station is in an infrastructure network.

59. A method for operating a client station configured to communicate with an access point (AP) in a wireless local area network (LAN), the method comprising:
controlling transitions of the client station between an active mode and a low power mode;
transitioning the client station to the active mode;
transmitting data to the AP when at least one of (i) the AP finishes transmitting directed data to the client station or (ii) the AP transmits a null data frame to the client station;
transitioning the client station to the low power mode when the client station finishes transmitting data to the AP;
regulating a supply voltage during the active mode via a first voltage regulator, wherein the first voltage regulator is powered down during the low power mode;
dissipating, via a second voltage regulator, less power than the first voltage regulator, wherein the second voltage regulator is configured to supply voltage during the low power mode;
selecting, via a media access controller (MAC) device, (i) the first voltage regulator during the active mode and (ii) the second voltage regulator during the low power mode;
performing radio frequency (RF) mixing;
communicating with the MAC device and a RF transceiver via a baseband processor (BBP);
generating a first clock signal for the BBP during the active mode via a first phase locked loop (PLL);
outputting a timing signal to the first PLL during the active mode via a crystal oscillator;
receiving the timing signal from the crystal oscillator during the active mode via a second PLL; and
generating a second clock signal for the RF transceiver.

60. The method of claim 59, wherein the AP uses at least one of (i) a random order or (ii) a rotating order to access the client station.

61. The method of claim 59, further comprising:
querying a host for frames to transmit to the AP (i) subsequent to transitioning the client station to the active mode and (ii) prior to receiving a timing beacon from the AP; and
storing the frames.

62. The method of claim 61, wherein an internal processor functions as the host and generates the frames.

63. The method of claim 59, further comprising:
transitioning the client station to the active mode prior to a first timing beacon from the AP; and
transitioning the client station to the low power mode prior to a subsequent timing beacon from the AP.

64. The method of claim 63, further comprising updating network time based on the first timing beacon.

65. The method of claim 64, further comprising setting the network time equal to a prior beacon time plus a beacon interval minus a fixed delay.

66. The method of claim 63, wherein the AP transmits one of multicast frames and broadcast frames to the client station immediately subsequent to transmitting the first timing beacon.

67. The method of claim 59, further comprising transmitting at least one frame to the AP following a short interframe space (SIFS).

68. The method of claim 59, wherein the AP establishes a basic service set (BSS) that includes (i) a contention free period (CFP) that follows a timing beacon and (ii) a contention base period (CBP) that follows the CFP.

69. The method of claim 59, wherein the AP transmits a null data frame to the client station when the AP has zero directed frames to transmit to the client station.

70. The method of claim 59, further comprising implementing the client station and the AP in a console gaming system.

71. The method of claim 70, further comprising:
implementing the client station in an input device of the console gaming system; and
implementing the AP in a console of the console gaming system.

72. The method of claim 59, wherein the client station is otherwise compliant with at least one of IEEE section 802.11, 802.11(a), 802.11(b), or 802.11(g).

73. The method of claim 59, wherein the wireless LAN is an infrastructure network.

74. The method of claim 59, wherein the client station is in an infrastructure network.

75. A method for operating a wireless local area network (LAN), the method comprising:
selectively operating a first client station and a second client station in a low power mode and an active mode;
establishing communications between the first and second client stations and an access point (AP) of the wireless LAN subsequent to transitioning the first and second client stations, respectively, to the active mode;
using at least one of a random order or a rotating order to access the first client station and the second client station;
accessing the first client station prior to the second client station;
transitioning the first client station to the low power mode prior to the AP completing access of the second client station; and
via the first client station
regulating a supply voltage during the active mode via a first voltage regulator, wherein the first voltage regulator is powered down during the low power mode;
dissipating, via a second voltage regulator, less power than the first voltage regulator, wherein the second voltage regulator is configured to supply voltage during the low power mode;
selecting, via a media access controller (MAC) device, (i) the first voltage regulator during the active mode and (ii) the second voltage regulator during the low power mode;
performing radio frequency mixing;
communicating with the MAC device and a radio frequency (RF) transceiver via a baseband processor (BBP);
generating a first clock signal for the BBP during the active mode via a first phase locked loop (PLL);
outputting a timing signal to the first PLL during the active mode via a crystal oscillator;
receiving the timing signal from the crystal oscillator during the active mode via a second PLL; and
generating a second clock signal for the RF transceiver.

76. The method of claim 75, further comprising:
transitioning the first client station to the active mode;
transmitting data from the first client station to the AP when at least one of (i) the AP finishes transmitting directed data to the first client station or (ii) the AP transmits a null data frame to the first client station; and
transitioning the first client station to the low power mode when the first client station finishes transmitting data to the AP.

77. The method of claim 75, further comprising:
transitioning the second client station to the active mode;
transmitting data to the AP when at least one of (i) the AP finishes transmitting directed data to the second client station or (ii) the AP transmits a null data frame to the second client station; and
transitioning the second client station to the low power mode when the second client station finishes transmitting data to the AP.

78. The method of claim 76, further comprising:
transitioning the first client station to the active mode prior to a first timing beacon from the AP; and
transitioning the first client station to the low power mode prior to a subsequent timing beacon from the AP.

79. The method of claim 78, further comprising updating network time based on the first timing beacon.

80. The method of claim 79, further comprising setting the network time equal to a prior beacon time plus a beacon interval minus a fixed delay.

81. The method of claim 76, further comprising transmitting at least one frame to the AP following a short interframe space (SIFS).

82. The method of claim 75, wherein the first client station and the second client station are otherwise compliant with at least one of IEEE section 802.11, 802.11(a), 802.11(b), or 802.11(g).

83. The method of claim 75, wherein the wireless LAN is an infrastructure network.

84. The method of claim 75, wherein the first client station and the second client station are in an infrastructure network.

85. The method of claim 75, further comprising:
transitioning the first client station and the second client station to the active mode; and
storing frames to transmit to the AP in at least one of (i) the first client station or (ii) the second client station prior to the first client station and the second client station receiving a timing beacon from the AP.

86. The method of claim 78, further comprising:
transmitting the first timing beacon; and
immediately transmitting one of multicast frames and broadcast frames from the AP to the first client station and the second client station.

87. The method of claim 75, further comprising establishing a basic service set (BSS) that includes (i) a contention free period (CFP) that follows a timing beacon and (ii) a contention base period (CBP) that follows the CFP.

88. The method of claim 87, wherein client stations in a restricted network communicate with the AP during the CFP, and wherein the client stations in the restricted network include the first client station and the second client station.

89. The method of claim 88, further comprising communicating with at least one wireless device that is external to the restricted network during the CBP.

90. The method of claim 76, further comprising transmitting the null data frame to the first client station when the AP does not have directed frames to transmit to the first client station.

91. The client station of claim 1, wherein the MAC device is configured to:
transition to the active mode based on a counter value and prior to a beacon interval;

at least one of generate frames or receive the frames from a host;

store the frames in a queue while monitoring reception of a beacon signal; and update a network time based on the beacon signal.

92. The client station of claim 91, wherein:
the RF transceiver is configured to determine whether the frames are received from the AP; and
the MAC device is configured to process the frames when (i) the frames are from the AP and (ii) the frames are at least one of broadcast frames or multicast frames.

93. The client station of claim 91, wherein:
the RF transceiver is configured to determine whether the frames are received from the AP; and
the MAC device is configured to process the frames when (i) the frames are from the AP, (ii) the frames are not at least one of broadcast frames or multicast frames, and (iii) the frames are directed to the client station.

94. The client station of claim 1, wherein the MAC device is configured to:
process frames received from a host when the frames are received within a short interframe space interval;
determine whether a last frame is received from the AP;
wait the short interframe space interval and transmit a first signal to the AP when the last frame is not received, wherein the first signal transmitted to the AP indicates more data is to be transmitted; and
wait the short interframe space interval and transmit a second signal to the AP when the last frame is not received, wherein the second signal transmitted to the AP indicates no more data is to be transmitted.

95. A system comprising:
the client station of claim 1; and
the AP, wherein the AP is configured to
transmit at least one of broadcast frames or multicast frames to the client station,
transmit the null data frame when the at least one of broadcast frames or multicast frames are directed to the client station, and
transmit a signal indicating whether there is more data to be transmitted when the at least one of broadcast frames or multicast frames are not directed to the client station.

96. The system of claim 95, wherein the AP is configured to:
transmit a beacon signal;
establish a contention free period subsequent to transmitting the beacon signal;
set a value N equal to a number of stations in the wireless LAN;
decrement the value N when there is no more data to be transmitted; and
end the contention free period based on the value N.

97. The client station of claim 1, wherein the MAC device transitions the client station to the low power mode when the RF transceiver finishes transmitting data to the AP without performing a power savings frame exchange with the AP.

98. The wireless LAN of claim 22, wherein the AP is configured to:
transmit a plurality of beacon signals to a plurality of client stations including the first client station and the second client station;
determine a client station access sequence subsequent to each of a plurality of beacon intervals, wherein the client station access sequence indicates an order in which the plurality of client stations communicate with the AP; and
equalize power consumption between the plurality of client stations including varying the client station access sequence by at least one of randomizing or rotating the order subsequent to transmitting each of the beacon signals.

* * * * *